(No Model.)

J. ROSS.
REAPER AND MOWER KNIFE SHARPENER.

No. 440,119. Patented Nov. 4, 1890.

Attest
A. Edmunds
Carl Hayden

Inventor
John Ross
By P. J. Edmunds
Attorney

UNITED STATES PATENT OFFICE.

JOHN ROSS, OF BLYTHE, CANADA, ASSIGNOR OF ONE-HALF TO GEORGE KING, OF SAME PLACE.

REAPER AND MOWER KNIFE SHARPENER.

SPECIFICATION forming part of Letters Patent No. 440,119, dated November 4, 1890.

Application filed April 14, 1887. Serial No. 234,786. (No model.) Patented in Canada May 7, 1886, No. 24,004.

*To all whom it may concern:*

Be it known that I, JOHN ROSS, farmer, a subject of the Queen of Great Britain, and a resident of Blythe, in the county of Huron, in the Province of Ontario, in the Dominion of Canada, have invented certain new and useful Improvements on Reaper and Mower Knife Sharpeners, (for which I have obtained a patent in Canada, No. 24,004, bearing date May 7, 1886,) of which the following is a specification.

This invention relates to a machine in which the knives or the knife-sections of reaping and mowing machines are sharpened; and this invention consists of the improved construction and combination of parts of the same, as will be hereinafter fully described and claimed, reference being had to the accompanying drawings, wherein—

Figure 1:
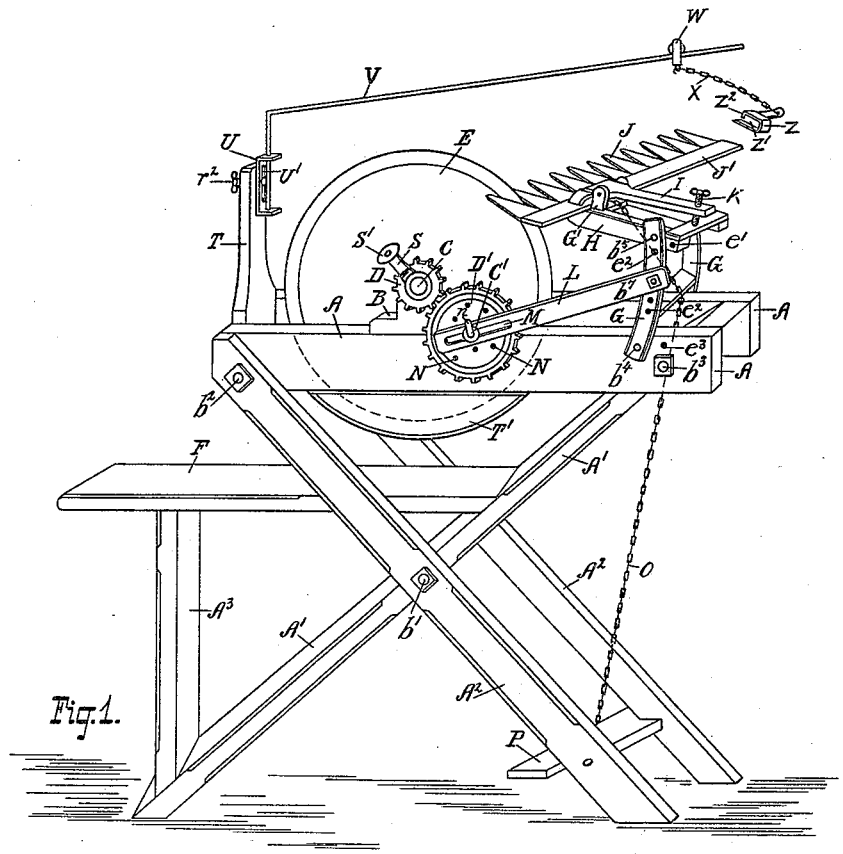
Figures 2, 3:
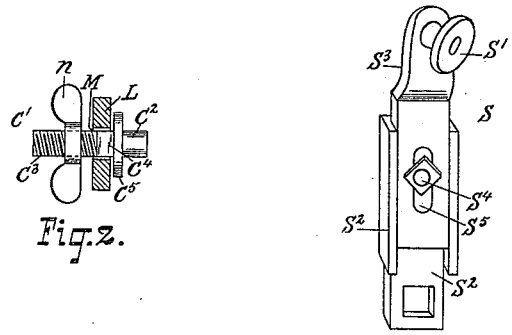

Figure 1 is a perspective view of a machine embodying these improvements. Fig. 2 is an enlarged detail side elevation of the stud-pin, together with a cross-sectional view of the connecting-bar. Fig. 3 is an enlarged detail perspective view of one of the cranks.

A designates parallel horizontal bars of the frame, on which rests a boxing B, in which the shafts revolve, to which are rigidly secured the toothed wheels D D'. The toothed wheel D and beveled grindstone E are rigidly secured to and revolve with the shaft C. The side bars A are supported by the sloping bars A' A², firmly secured together by three bolts $b'$ $b^2$ $b^3$.

F designates a seat secured at one end to the sloping bar A' and at the other end to an upright A³, the latter being rigidly secured to the sloping bar A'. This construction of a frame gives a wide base for the machine, which, in connection with the weight of the operator on the seat F, completely prevents any possibility of the machine upsetting.

G is a standard-frame pivoted on the pivot-bolt $b^4$, the latter being secured in the side bars A A.

$b^5$ is a pivot-bolt secured in the standard-frame G, near the upper end, on which the knife-holder H is pivoted.

I designates a lever-clamp pivoted on a pivot-bolt secured in a standard G' or other suitable support which may project up from the knife-holder H, which lever-clamp I is operated by a screw K to clamp the knives J on the holder H to rigidly and firmly secure the said knives thereon, when required. The short end of the lever-clamp I engages with the knives J, and a screw K passes through this clamp near the long end, the lower end of which screw K engages with the knife-holder H, as shown in accompanying drawings, so that by turning this screw K the opposite end of the clamp I may be readily and easily adjusted to bind the knives J on, or to permit them to be removed from, the knife-holder H.

A series of holes $e'$ is formed in the knife-holder H, and another series of holes $e^2$ is formed in the standard-frame G to permit of the adjustment of the holder and knives secured thereon to grindstones as they decrease in size or to smaller or larger grindstones, as required. By adjusting the bolt $b^5$ in the holes $e'$ in the knife-holder H to or from the grindstone the knife-holder H is adjusted forward or backward from the grindstone to adapt the knives to lie on the grindstone in the proper position, and by adjusting the bolt $b^5$ upward or downward in the holes $e^2$ the knife-holder H is adjusted upward or downward to adapt itself to grindstones of smaller or larger diameter, as required, and by adjusting the bolt $b^4$ in the holes $e^3$ in the side bars A of the frame to or from the grindstone the standard-frame is adjusted, together with the knife-holder H and knives firmly secured thereon, to stones of different sizes, according to the distance the bolt is adjusted.

L is a connecting-bar secured at one end to the standard-frame G by a bolt $b^7$, and a stud-pin C' is secured in a slot M or its equivalent in this bar L by a thumb-nut $n$ or other suitable securing device, by loosening which the stud-pin C' is permitted to move back and forth in the slot M when required, and the stud-pin C' is rigidly held at the position to which it is adjusted by tightening the thumb-nut $n$ again. The stud-pin C' has a projecting entering end C², which is for insertion into the holes N, formed in the side of the toothed wheel D', a screw-threaded portion C³, on which the thumb-nut $n$ is screwed, and another part $C^4$, formed square in cross-section, which is fitted to the slot M in the connecting-bar L to prevent said stud-pin $C'$ from turning, and with a flange $C^5$, between which and the thumb-nut $n$ the connecting-bar L is rigidly bound and secured thereto when required. By adjusting the bolt $b^7$ up or down in the holes $e^2$ in the standard-frame G the slotted bar L is adjusted to give a longer or shorter stroke to the standard-frame, knife-holder, and knives secured thereon to sharpen knives of different lengths. By adjusting the stud-pin $C'$ in the slot M to or from the end of the slotted bar L the knives are sharpened more or less at the heel or point, according as the stud-pin $C'$ is adjusted to or from the end of the slotted bar L. The stud-pin $C'$ is retained in sockets N in the toothed wheel $D'$ by the resilience of the slotted bar L, which has a lateral spring movement.

N N are sockets, one formed at the center of and others formed at different distances from the center of the toothed wheel $D'$. By adjusting the stud-pin $C'$ in these sockets to or from the center of the toothed wheel $D'$ a still longer or shorter stroke is given to the knives through their connecting mechanism to sharpen knives of different lengths, so that by these devices the machine may be readily and quickly adjusted to sharpen knives of different lengths.

O is a flexible band, connected at one end to the knife-holder H, and is attached at the other end to the foot-press P, pivoted in the lower ends of the sloping bars $A^2$, by pressing on which with the foot the flexible band O is drawn downward, as well as the knife-holder H, and the knives secured thereon, thereby pressing the knives down on the stone to rapidly sharpen the same.

S S are cranks rigidly secured to the shaft or axle C, one on each side of the grindstone E. The arms of these cranks S (shown particularly in detail in Fig. 3) are formed in two bars $S^2$ and $S^3$. The bar $S^2$ is rigidly secured to the axle C, and the bar $S^3$ is adjustable, and when properly set is rigidly held there by a bolt $S^4$, and this bolt $S^4$ passes through an elongated aperture $S^5$ in the bar $S^3$. This elongated aperture $S^5$ is formed in the bar $S^3$, so that the crank-arms may be readily and easily lengthened or shortened at will to adapt them to large or small stones, and to stones as they decrease in size; or these crank-arms may be lengthened to increase their power.

$S'$ are knobs or handles revolving loosely on pins or studs in the ends of the cranks S. By grasping and revolving these handles and cranks motion is readily and easily imparted to the grindstone E and knives J through their connecting mechanism simultaneously.

T is a standard rigidly secured to the bars A A, which not only retains these bars the proper distance apart, but prevents the grindstone from throwing the water it takes up with it from the reservoir $T'$ onto the operator when sharpening the reaper or mower knives, as the water strikes against the standard T, thus forming a water-guard.

U is a bracket formed with a slot $U'$, through which and the standard T a bolt passes, and the bracket U is firmly secured at any desired height on the standard T by tightening the thumb-nut $r^2$, which binds the bracket to the standard T between the enlarged head of the bolt and said thumb-nut.

V is a rod pivotally secured in a socket in this bracket U.

W is a pulley, which revolves on the rod V, and through the frame of which the said rod V passes.

X is a flexible band connecting the pulley W with a knife-holder Z. This knife-holder Z is formed with a socket $Z'$ to receive the enlarged part $J'$ of the knives for the purpose of holding up and retaining the knives parallel while being sharpened. A flange $Z^2$ projects down from this holder Z in front of the enlarged portion $J'$ of the knives to prevent the holder from becoming detached therefrom while the knives are being sharpened. As the sections of the knives are sharpened, they are moved outward, and as they are moved outward the pivotal rod V swings toward one side, and the pulley W revolves a short distance toward the end of the rod automatically, so that no attention has to be paid to these parts, as they automatically adjust themselves with the knife as it is moved farther outward. The flexible band X is required to be taut to attain this result, and the bracket U, together with the rod V, is readily adjusted up or down on the standard T by loosening the thumb-nut $r^2$ to bring this flexible band X taut, and when at the required position it is retained there by tightening the thumb-nut $r^2$ again. By forming a tension on this flexible band X and pressing down on the foot-press P a tension is formed on the flexible band O, which holds the knife-sections perfectly steady while they are being sharpened.

The operation of the entire machine is as follows: The knife-sections J are first secured on the knife-holder H by the lever-clamp I and screw K. The operator then grasps the handles $S'$ of the cranks S on each side of the machine and revolves said cranks S, and they, as well as the toothed wheel D and beveled grindstone E, being rigidly secured on the shaft C, and the teeth of the toothed wheel D engaging with the teeth of the toothed wheel $D'$ as the cranks S are revolved the shaft C, toothed wheels D and $D'$, and grindstone F are also revolved, and a back-and-forth motion is imparted to the upper end of the standard-frame G from the toothed wheel $D'$ by the connecting-bar L when the latter engages with the toothed wheel $D'$ off the center, and as the standard-frame G moves back and forth to and from the stone G the knife-holder H, pivoted near the upper end of the standard-frame G, as well as the knife-sections J, secured on said knife-holder H are moved back and forth to sharpen said knife-sections J from heel to point. When doing this properly, the stone should revolve once around while the knife-sections are being carried from heel to point, and while the knife-sections J at one end of the bar are being sharpened the other end is supported in a horizontal position by the flexible band X, rod V, and knife-holder Z. At the same time the stone E is kept continually moist to prevent the sections from heating, and thereby prevented from losing their temper by the face of the stone coming in contact with the water in the reservoir T', and the water-guard T prevents the water taken up by the stone as it is rapidly revolved from splashing on the operator. When wishing to sharpen the adjacent sides of two knife-sections J at one time, adjust the center of the stone on a line with the junction of two knife-sections. When wishing to sharpen one side of a section at one time, draw the adjacent section to one side, so that it will not rest on the stone. To grind a notch out of one of the sections, adjust the entering end $C^2$ of the stud-pin C' in the hole N at the center of the toothed wheel D'. Then loosen the thumb-nut $n$ until the stud-pin C' moves perfectly free in the slot M. Then adjust the connecting-bar L, together with the standard-frame G, knife-holder H, and knife-sections J, in connection therewith, back or forth, until the notch rests directly on the stone. Then tighten the thumb-nut $n$ to hold these parts at this position. This adjustment of the entering end $C^2$ of the stud-pin C' in the hole N at the center of the toothed wheel D' keeps the knife-section in a stationary position, so that it is only being ground in the one spot until the notch is ground out. If the knife-sections are not being properly sharpened from heel to point at one revolution of the stone, place the entering end $C^2$ of the stud-pin C' in a hole N farther from the center of the toothed wheel D'. This will sharpen them more at the heel and point, while if the knife-sections are being ground too much at the point and heel place the entering end $C^2$ of the stud-pin C' in a hole N nearer the center of the toothed wheel D', and this will sharpen the knife-sections more at the center between the heel and point. If the knife-sections are grinding too much at the point and not enough at the heel, loosen thumb-nut $n$ until the stud-pin C' is perfectly free in the slot M. Then draw the standard-frame G and connections toward the stone. This shortens the length of the connecting-bar L between the stud-pin C' and the standard frame G. Then tighten the thumb-nut $n$ again. This sharpens the knife-sections more at the heel. If the knife-sections are grinding too much at the heel and not enough at the point, loosen thumb-nut $n$ and move the standard-frame G and connections from the stone E. This increases the length of the connecting-bar L between the stud-pin C' and standard-frame G. Then tighten thumb-nut $n$ again. This sharpens the knife-sections more at the point. When the knife-holder H and connections are adjusted to properly sharpen the knife-sections secured thereon from heel to point and it is required to sharpen a longer section, adjust the bolt $b^7$, on which the connecting-bar L is pivoted, in a hole $e^2$ lower down in the standard-frame G, and, vice versa, if you wish to sharpen a shorter knife-section, adjust the bolt $b^7$ in a hole $e^2$ higher up in the standard-frame G. To adjust the knife-holder and connections so that the knife-sections will lie in proper position on large and small stones E, adjust the bolt $b^5$ higher up in pin-holes $e^2$ in the standard-frame G and in the knife-holder H, to adapt the knife-sections to lie in proper position on stones of larger diameter, and vice versa on stones of smaller diameter. In stones of extra large size first adjust the bolt $b^4$ on which the standard-frame G is pivoted from the stone E in the perforations $e^3$ in the side bars A A. When this is done, a very slight adjustment of the bolt $b^5$ upward on the standard-frame G or backward on the knife-holder H would only be required to adapt the knife-sections to lie in proper position on the stone, and when the knife-sections are lying in proper position on the stone the latter passes over the knife-sections once evenly and regularly from heel to point at each revolution of the stone.

Having thus described my invention, what I claim as new, and desire to secure by Letters Patent, is—

1. The pulley W, in combination with the pivotal rod V, flexible band X, and knife-holder Z, substantially as shown and described, and for the purpose specified.

2. A bracket U, formed with a slot U', thumb-nut and bolt $r^2$, and standard T, in combination with a rod V, pulley W, flexible band X, and knife-holder Z, substantially as shown and described, and for the purpose specified.

3. A flexible band X and knife-holder Z, connecting the outer end of the knives J to a rod V by a pulley or other suitable connection, in combination with a flexible band O, connecting the knife-holder H with a foot-press P, for the purpose of steadying said knives while being sharpened, substantially as shown and described.

4. The bracket U, formed with a slot U', thumb-nut and bolt $r^2$, rod V, pulley W, flexible band X, and knife-holder Z, in combination with the side bars A A, inclined bars A' and $A^2$, upright $A^3$, and seat F, substantially as and for the purposes set forth.

5. A bracket U, formed with a slot U', thumb-nut and bolt $r^2$, rod V, pulley W, flexible band X, and knife-holder Z, in combination with a beveled grindstone E, double cranks S S, and a frame for supporting the same, substantially as and for the purpose set forth.

6. The toothed wheel D', having a socket N at the center thereof, stud-pin C', fitted thereto, connecting-bar L, formed with slot M, in which the stud-pin C' is secured, said stud-pin C' being held in the socket N by the resilience of the spring connecting-bar L, standard-frame G, and knife-holder H, in combination with the beveled stone E and means for supporting and operating these devices for the purpose of grinding notches out of the knife-sections, as set forth.

7. The flexible band X, knife-holder Z, and pivotal rod V, in combination with the toothed wheel D', having a socket N formed at the center thereof, stud-pin C', fitted thereto, resilient-spring connecting-bar L, formed with a slot M, in which the stud-pin C' is adjustably secured, stud-pin C' being held in the socket N by the resilience of the spring connecting-bar L, standard-frame G, knife-holder H, and means for supporting and operating the same, whereby the outer end of the knife-sections are supported in a horizontal position while a notch is being ground out of one of the sections, as set forth.

8. The toothed wheel D', having sockets N formed at different distances from the center, stud-pin C', fitted thereto, the resilient spring connecting-bar L, formed with slot M, in which the stud-pin C' is secured, said stud-pin C' being held in the sockets N by the resilience of the spring connecting-bar L, standard-frame G, and knife-holder H, in combination with the beveled grindstone E and supporting-frame, substantially as specified.

9. The flexible band X, knife-holder Z, and pivotal rod V, in combination with the toothed wheel D', having sockets N formed at different distances from the center, stud-pin C', fitted thereto, the resilient-spring connecting-bar L, formed with slot M, in which the stud-pin C' is secured, said stud-pin C' being held in the sockets N by the resilience of the spring connecting-bar L, standard-frame G, and knife-holder H, in combination with the beveled grindstone E and the devices whereby the outer ends of the knives J are supported in a horizontal position while grinding the knife-sections more at the heel or point, as set forth.

10. A knife-holder Z, flexible band X, and pivotal rod V, in combination with a toothed wheel D', stud-pin C', connecting-bar L, adjustable standard-frame G, and knife-holder H, substantially as and for the purpose specified.

In testimony whereof I affix my signature in the presence of the two undersigned witnesses.

JOHN ROSS.

Witnesses:
P. J. EDMUNDS,
A. EDMUNDS.